Dec. 3, 1929. M. W. MOESTA 1,737,861
MEANS FOR JOINING FRAME MEMBERS OF VEHICLE BODIES
Filed Aug. 12, 1927
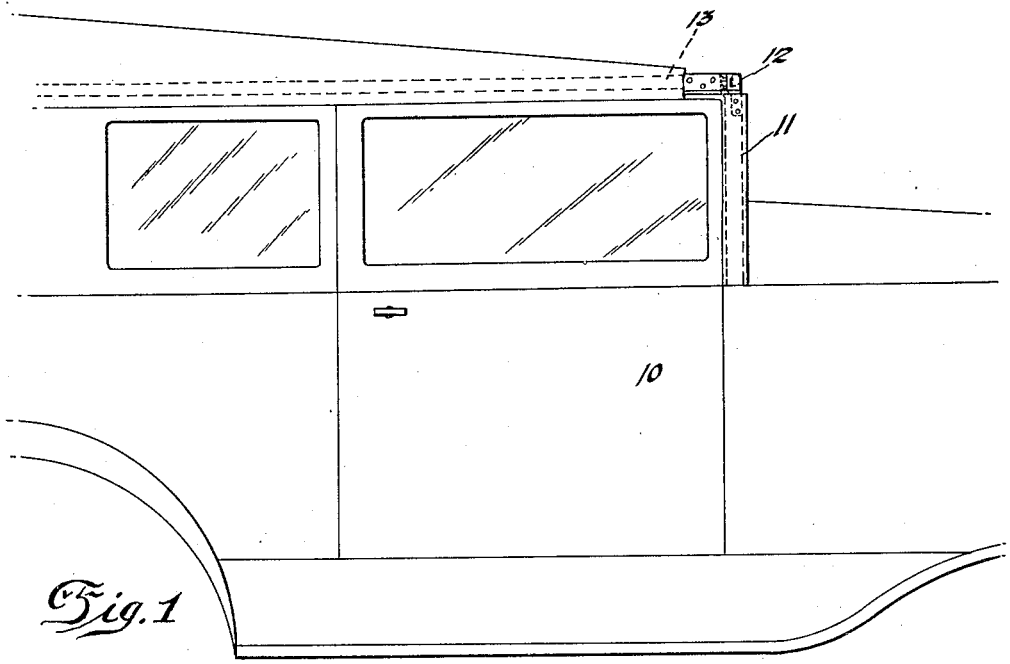
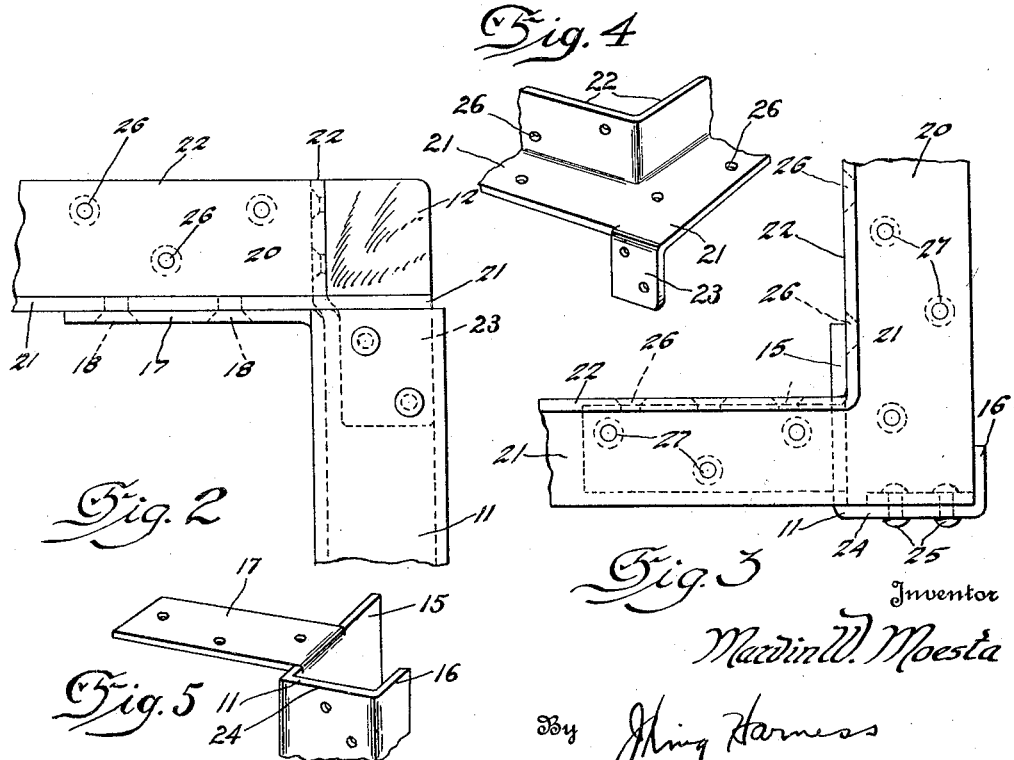
Inventor
Mardin W. Moesta
By J. King Harness
Attorney Patented Dec. 3, 1929

1,737,861

UNITED STATES PATENT OFFICE

MARVIN W. MOESTA, OF DETROIT, MICHIGAN, ASSIGNOR TO THE MURRAY CORPORATION OF AMERICA, A CORPORATION OF MICHIGAN

MEANS FOR JOINING FRAME MEMBERS OF VEHICLE BODIES

Application filed August 12, 1927. Serial No. 212,379.

One object of my invention is to provide efficient and easily applied means for securing together the frame members of vehicle bodies.

Another object of my invention is to provide means for securing roof rails and front cross members of the tops of closed vehicle bodies together and to the front pillars of the body.

Another object of my invention is to provide a means for securing wooden roof rails and cross members to the steel upright pillars in closed vehicle bodies.

With these and other objects in view, my invention consists in the arrangement, combination and construction of the various parts of my improved device, as described in the specification, claimed in my claims and shown in the accompanying drawing, in which:

Fig. 1 is a side elevation of a portion of a closed vehicle body, illustrating the application of my invention to the roof rail, front cross member and front upright pillar.

Fig. 2 is a view in side elevation, showing the application of my invention to the front top supporting pillar, the roof rail and the front cross member of the vehicle body shown in Fig. 1.

Fig. 3 is a plan view of my invention as applied to the vehicle body shown in Fig. 1.

Fig. 4 is a fragmentary perspective of the bracket embodied in my invention.

Fig. 5 is a perspective of the top of the vehicle pillar upon which the bracket shown in Fig. 4 is supported and to which it is attached.

I have shown a vehicle body 10 having a front top supporting pillar 11, a front top cross member 12, a fore and aft roof rail 13. For purposes of illustration, the pillar 11, as shown, is of steel of channel shape in cross section having a rear channel side 15 of greater length than the front channel side 16, as shown in Fig. 3. As shown in Fig. 2, a portion of the rear channel side 15 of the pillar 11 adjacent the top thereof is bent to form a horizontal flange 17 which extends rearwardly. Secured to this flange 17 by bolts or rivets 18 is an angle shaped bracket 20 having flat horizontally extending base portions 21 and vertical upstanding flanged portions 22 on the rear edges thereof. The bracket 20 has an integral depending flange 23 formed adjacent its outer corner which extends downwardly and bears against the bottom 24 of the pillar 11 and is secured thereto by rivets 25. The vertical flanges 22 of the bracket 20 are provided with a plurality of apertures 26 through which bolts or screws may be inserted to engage the front cross member 12 and the roof rail 13 which are positioned upon the horizontal base portions 21. The base portions 21 are also provided with apertures 27 through which screws or bolts may be inserted to engage the front cross member and the roof rail.

It will be obvious that various changes may be made in the arrangement, combination and construction of various parts of my improved device without departing from the spirit of my invention and it is my intention to cover by my claims such changes as may be reasonably included in the scope thereof.

What I claim is:

1. In a vehicle body a joint support for longitudinal and transverse roof rails comprising the combination of an upright metal pillar member of channel shape in cross section and having one channel side bent adjacent the top thereof and forming a horizontal support, a metal bracket comprising a flat base portion extending along two sides of an angle, integral vertical flanges formed on and extending upwardly from the inner edge of said base portion, and an integral depending flange adjacent the outer corner of said base, said bracket base being secured to the horizontal support on said pillar member and said depending flange on said bracket being secured to the channel bottom of said pillar member.

2. In a vehicle body construction a forward corner support for longitudinal and transverse wood roof supporting members, comprising the combination of a metal pillar of channel shape in cross section having one channel side extended and bent rearwardly at its top to form a horizontal support, and an angle shaped metal bracket supported on said horizontal flange and having base portions extending beneath and supporting the under sides of the adjoining ends of said longitudinal and transverse members, and a vertical flange along the inner edge of said base portions embracing the inner sides of the adjoining ends of said longitudinal and transverse members, and having a depending lug adjacent its outer corner secured to the channel bottom of said pillar member.

MARVIN W. MOESTA.